(12) United States Patent
Sugiyama et al.

(10) Patent No.: US 8,965,260 B2
(45) Date of Patent: Feb. 24, 2015

(54) IMAGE-FIXATION MEMBER HAVING MULTI-LAYER METALLIC STRUCTURE

(71) Applicants: Nok Corporation, Tokyo (JP); Synztec Co., Ltd., Tokyo (JP)

(72) Inventors: Shingo Sugiyama, Kanagawa (JP); Akira Nishida, Kanagawa (JP); Minoru Takeda, Tokyo (JP)

(73) Assignees: Nok Corporation, Tokyo (JP); Synztec Co., Ltd., Tokyo (JP)

( * ) Notice: Subject to any disclaimer, the term of this patent is extended or adjusted under 35 U.S.C. 154(b) by 87 days.

(21) Appl. No.: 13/772,906

(22) Filed: Feb. 21, 2013

(65) Prior Publication Data

US 2013/0224514 A1 Aug. 29, 2013

(30) Foreign Application Priority Data

Feb. 23, 2012 (JP) ................................ 2012-038044

(51) Int. Cl.
*G03G 15/20* (2006.01)
*B32B 15/04* (2006.01)
*B32B 15/082* (2006.01)

(52) U.S. Cl.
CPC .......... *G03G 15/2057* (2013.01); *B32B 15/043* (2013.01); *B32B 15/082* (2013.01)
USPC ...................................................... 399/329

(58) Field of Classification Search
CPC .......... G03G 15/2053; G03G 15/2057; G03G 2215/2016
USPC ................................................... 399/329, 333
See application file for complete search history.

(56) References Cited

U.S. PATENT DOCUMENTS 7,433,642 B2 * 10/2008 Higashi et al. ................ 399/333
7,480,479 B2 * 1/2009 Nanjo et al. ................... 399/328
8,311,468 B2 * 11/2012 Qi et al. ........................ 399/328

FOREIGN PATENT DOCUMENTS

JP 2004-004660 1/2004

* cited by examiner

*Primary Examiner* — Gregory H Curran
(74) *Attorney, Agent, or Firm* — Young & Thompson

(57) ABSTRACT

The present invention provides a fixation member having a multi-layer metallic structure, which member comprises a substrate employing electroformed nickel for preventing image quality failure. The fixation member of the present invention includes a metallic substrate including a first layer formed of an electroformed seamless belt made of nickel or a nickel alloy, and a second layer formed of an electroformed seamless belt made of a metal having a thermal conductivity greater than that of the first layer; an adhesion layer disposed on the surface of the second layer; and a fluororesin layer disposed by the mediation of the adhesion layer, wherein the ratio of the thickness of the second layer to the total thickness of the metallic substrate is 0.66 to 0.95.

8 Claims, 4 Drawing Sheets

IMAGE-FIXATION MEMBER HAVING MULTI-LAYER METALLIC STRUCTURE

The entire disclosure of Japanese Patent Application No. 2012-038044 filed on Feb. 23, 2012 is expressly incorporated by reference herein.

BACKGROUND OF THE INVENTION

Field of the Invention

The present invention relates to an image-fixation member (hereinafter may be referred to simply as a fixation member) having a multi-layer metallic structure, which member is employed as a fixation belt or a press belt. More particularly, the fixation member of the invention is suited for serving as a fixing belt or a press belt of a fixation member employed in an image-forming apparatus such as a copying machine, a facsimile machine, or a laser-beam printer.

Image-forming apparatuses employ a belt-fixation format in order to meet demands such as downsizing, energy-saving, and high printing and copying speed. Thus, a rubber fixation roller employed in such an image-forming apparatus has been replaced by a fixing belt having no end (i.e., an endless belt or endless film).

In such a belt-format fixation unit, when a fixation belt formed of polyimide resin, which is a heat-resistant polymer material, is used, difficulty is encountered in increasing fixation rate, due to poor thermal conductivity of the material, and a long period of time is required in reaching a steady temperature at starting of the fixation unit. In order to overcome these drawbacks, there has been employed a fixation belt which is made of a metal such as nickel and which has high thermal conductivity and excellent dimensional stability. For example, there has been proposed a substrate which has resistivity to heat treatment during provision of a release layer and which is produced through electroforming of nickel-carbon alloy (see Patent Document 1).

However, since image quality (e.g., resolution) and printing speed have been enhanced in recent years, failure in printed image quality; such as uneven gloss, problematically occur in a case of, for example, a continuous printing operation handling paper sheets having different widths.

Patent Document 1: Japanese Patent Application Laid-Open (kokai) No. 2004-004660

SUMMARY OF THE INVENTION

In view of the foregoing, an object of the present invention is to provide a fixation member having a multi-layer metallic structure, which member comprises a substrate employing electroformed nickel for preventing image quality failure.

In a first mode of the present invention for attaining the object, there is provided a fixation member having a multi-layer metallic structure, the member comprising:

a metallic substrate including a first layer formed of an electroformed seamless belt made of nickel or a nickel alloy, and a second layer formed of an electroformed seamless belt made of a metal having a thermal conductivity greater than that of the first layer;

an adhesion layer disposed on the surface of the second layer; and a fluororesin layer disposed on top of the adhesion layer, wherein the ratio of the thickness of the second layer to the total thickness of the metallic substrate is 0.66 to 0.95.

A second mode of the present invention is a specific embodiment of the fixation member of the first mode, wherein the second layer is formed of a plating layer made of copper or a copper alloy, and the fixation member further has, on the second layer, a third layer made of a metal having a corrosion resistance higher than that of the second layer.

A third mode of the present invention is a specific embodiment of the fixation member of the second mode, wherein the third layer is formed of a plating layer made of nickel or a nickel alloy.

A fourth mode of the present invention is a specific embodiment of the fixation member of any one of the first to third modes, which member further includes an elastic layer intervening between the metallic substrate and the fluororesin layer.

The fixation member having a multi-layer metallic structure of the present invention includes a first layer formed of an electroformed seamless belt which is made of nickel or a nickel alloy, which can be produced at high precision and which has high durability, and a second layer formed of an electroformed seamless belt made of a metal having a thermal conductivity greater than that of the first layer. Therefore, during a continuous printing operation, the difference in temperature ($\Delta T$) between the paper passage area of the fixation member and the non-paper-passage area thereof can be reduced. That is, even when a wider paper sheet is subjected to printing operation after completion of continuous printing of paper sheets having a smaller width, a high-quality print image having no image failure such as uneven gloss can be obtained.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF PREFERRED EMBODIMENTS

Figure 1A:
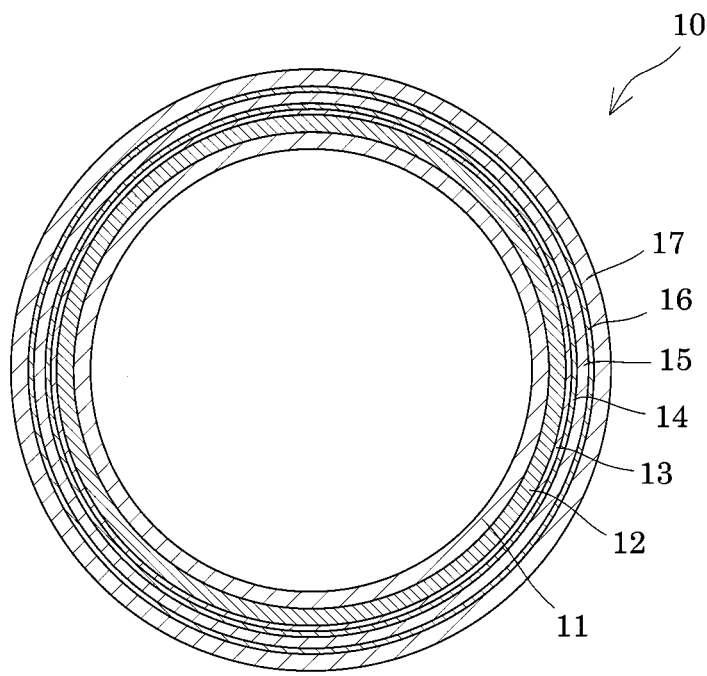
FIG. 1A is a cross-section of a fixation member having a multi-layer metallic structure according to one embodiment of the present invention.

The present inventors have found that, when paper sheets having various widths are subjected to a printing process, particularly when wide paper sheets are subjected to a printing process immediately after completion of a printing process of a large number of narrow paper sheets, image failure such as uneven gloss tends to occur, and that a likely cause of such image failure is the difference in temperature ($\Delta T$) between the paper passage area of the fixation member and the non-paper-passage area thereof. The present invention has been accomplished on the basis of these findings.

The present inventors have also found that image failure such as uneven gloss can be substantially prevented through suppressing the difference in temperature ($\Delta T$) between the paper passage area of the fixation member and the non-paper-passage area thereof to 20° C. or less.

On the basis of these findings, a target of the present invention is to suppress the difference in temperature ($\Delta T$) between the paper passage area and the non-paper-passage area to 15° C. or less, after the fixation member has been subjected to a predetermined test.

The fixation member of the present invention having a multi-layer metallic structure has a metallic substrate including an endless-belt-like first layer formed of an electroformed seamless belt made of nickel or a nickel alloy, and a second layer formed of an electroformed seamless belt made of a metal having a thermal conductivity greater than that of the first layer; an adhesion layer disposed on the second layer; and a fluororesin layer disposed on top of of the adhesion layer.

By virtue of the first layer formed of an electroformed seamless belt made of nickel or a nickel alloy, which first layer can be produced with high precision and high durability, and the second layer formed of an electroformed seamless belt made of a metal having a thermal conductivity greater than that of the first layer, the fixation member of the present invention has high dimensional stability and high durability as well as remarkably high thermal conductivity. In other words, since the fixation member of the present invention has a second layer having a thermal conductivity greater than that of the first layer and a thickness greater than a predetermined value, excellent thermal conductivity can be attained. Thus, conceivably, even after paper sheets having various sheet widths have been subjected to a continuous printing process by means of the fixation member, when narrow paper sheets are then subjected to a continuous printing process, heat of the non-paper-passage area, having relatively high temperature, is smoothly transferred to the paper-passage area, to thereby suppress the difference in temperature ($\Delta T$) between the two areas to 15° C. or less. Furthermore, even when paper sheets having a larger width are then subjected to a continuous printing process immediately thereafter, image failure, which would otherwise be caused by the difference in temperature ($\Delta T$) between the two areas, is conceivably reduced.

The first layer is made of electroformed nickel. The electroformed nickel is metallic nickel or an electroformed nickel alloy containing one or more elements of phosphorus, iron, cobalt, and manganese.

The metal forming the second layer has a thermal conductivity greater than that of nickel or the nickel alloy forming the first layer. The thermal conductivity of the metal forming the second layer is preferably twice or more, more preferably thrice or more, that of nickel or the nickel alloy. Specifically, since the thermal conductivity of nickel is about 90 W/mK, the thermal conductivity of the metal forming the second layer is preferably 180 W/mK or more, more preferably 270 W/mK or more. Examples of the second layer metal include copper (398 W/mK), silver (420 W/mK), gold (320 W/mK), and aluminum (237 W/mK). From the viewpoints of production technique and cost, the electroformed seamless belt is preferably made of copper or a copper alloy.

However, since copper or a copper alloy readily forms surface oxide film, a third layer made of a metal having a corrosion resistance higher than that of the electroformed seamless belt made of copper or a copper alloy is preferably disposed on the second layer.

The third layer may have such a small thickness that the layer imparts corrosion resistance to the fixation member. Thus, the third layer is not necessarily formed through electroforming and may be formed through chemical plating. Examples of the metal forming the third layer include gold, silver, chromium, nickel, and nickel alloy. Among them, nickel and nickel alloy are particularly preferred.

The fixation member having a multi-layer metallic structure of the present invention has an endless-belt-like metallic substrate having two, three, or more layers. The ratio of the thickness of the second layer to the total thickness of the metallic substrate (hereinafter the ratio may be referred to as a "second layer thickness ratio") is 0.66 to 0.95.

When the second layer thickness ratio is less than 0.66, the difference in temperature ($\Delta T$) between the paper passage area of the fixation member and the non-paper-passage area thereof after passage of paper sheets becomes 15° C. or more, whereas when the second layer thickness ratio is in excess of 0.95, the produced fixation member has poor durability, dimensional stability, and corrosion resistance. In this case, when no first layer is disposed, durability, dimensional stability, and the like are impaired.

The total thickness of the metallic substrate is preferably 20 to 100 μm, more preferably 25 to 60 μm. When the thickness is less than 20 μm, the strength of the fixation member is not ensured, whereas when the thickness is in excess of 100 μm, bending stress increases, and durability tends to decrease.

The metallic substrate of the present invention is based on an electroformed nickel seamless belt. Thus, the substrate has excellent dimensional stability and a smooth surface.

In one embodiment, the fixation member of the present invention has a first adhesion layer disposed on the surface of the second layer, an elastic layer disposed on top of the adhesion layer, a second adhesion layer disposed on the elastic layer, and a fluororesin layer disposed on top of the second adhesion layer. In the case of a bi-layer structure, the elastic layer is disposed on the second layer on top of the first adhesion layer. In the case of a tri-layer structure, the elastic layer is disposed on the third layer on top of the first adhesion layer.

The elastic layer is preferably formed of a material having high heat resistance. Examples of the material include silicone rubber, fluororubber, and urethane rubber. Of these, silicone rubber is particularly preferred. The thickness of the elastic layer is, for example, 20 to 1,000 μm, preferably 50 to 500 μm. When the elastic layer has such a thickness, toner fixability and image quality are enhanced. If not required, the elastic layer may be omitted.

The fluororesin layer is preferably made of a PFA tube, more preferably a heat-shrinkable PFA tube. The adhesion layer is disposed so as to strongly bind the fluororesin layer. Preferably, the adhesion layer is formed through heat treatment of an adhesive coating layer containing PFA particles at a temperature where PFA is melted.

Alternatively, the fluororesin layer may be formed through the following steps: modifying the inner surface of a heat-shrinkable PFA tube so as to enhance adhesion thereof; applying a silicone-rubber-based adhesive on a substrate; coating the substrate with the PFA tube so as to attain tight bond with the adhesive; and heating the stacked structure at a curing temperature of the silicone-rubber-based adhesive.

Yet alternatively, the fluororesin layer may be formed as a coating layer from a coating material containing PFA particles through spraying, dipping, or a similar technique. In one specific procedure, an adhesive containing PFA particles is applied to form an adhesive layer, and the aforementioned fluororesin layer is disposed on the adhesive layer. The fluororesin layer and the adhesion layer are melted together by heat.

Figure 1B:
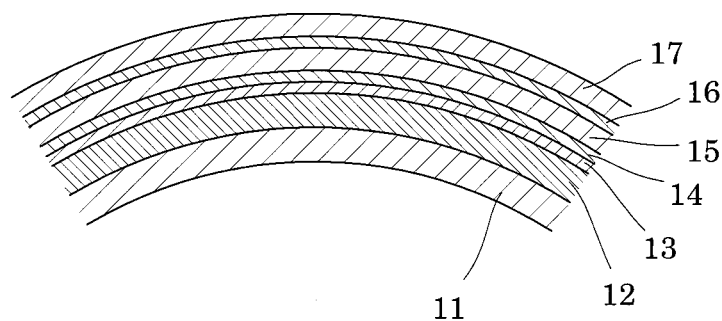
FIG. 1B is an enlarged view of the cross-section of FIG. 1A.

Hereinafter, an embodiment of the present invention will be described in detail. FIGS. 1A and 1B are schematic views of an embodiment of the fixation member having a multilayer metallic structure of the present invention. That is, FIGS. 1A and 1B are schematic views of a fixation member having a tri-layer metallic structure.

As shown in FIGS. 1A and 1B, a fixation member having a multi-layer metallic structure 10 has a metallic substrate which includes an endless-belt-like first layer 11 formed of an electroformed nickel seamless belt, a second layer 12 made of copper or a copper alloy, and a third layer 13 serving as a corrosion-resistant film. On the third layer 13, an elastic layer 15 is disposed on top of a first adhesion layer 14. On the elastic layer 15, a fluororesin layer 17 is disposed on top of a second adhesion layer 16.

The first layer 11 has an endless belt shape and is formed of a seamless belt made of electroformed nickel or a nickel alloy (hereinafter may be referred to as electroformed nickel seamless belt). Examples of the nickel alloy include nickel alloys containing one or more elements among phosphorus, iron, cobalt, and manganese. The first layer 11 formed of an electroformed nickel seamless belt is preferably made of an electroformed Ni—P alloy, more preferably an electroformed Ni—P alloy having a phosphorus content of 0.05 mass % to 1 mass %. When the first layer 11 formed of an electroformed nickel seamless belt has a phosphorus content less than 0.05 mass %, heat/fatigue resistance characteristics of the first layer 11 cannot be sufficiently enhanced, whereas when the phosphorus content is in excess of 1 mass %, the flexibility of the first layer 11 may be impaired.

Generally, the first layer 11 formed of an electroformed nickel seamless belt may be produced through electroforming by use of a nickel electroforming bath such as a Watt's bath—a bath predominantly containing nickel sulfate or nickel chloride—and a sulfamate bath predominantly containing nickel sulfamate. Electroforming includes a step of thick-plating of a master and a step of removing the plate from the master.

In one procedure of production of the first layer 11 formed of an electroformed nickel seamless belt, a cylindrical master made of stainless steel, brass, aluminum, or a similar material is used, and a nickel plating film is formed on the surface of the master by use of an electroforming nickel bath. In the case where a master made of a non-conductive material (e.g., silicone resin or gypsum) is used, the master is subjected to conductivity-imparting treatment with graphite or copper powder, or through metalizing (silver mirror formation), sputtering, or a similar technique. In the case of electroforming of a metallic master, the surface of the metallic master is preferably subjected to a release-facilitating treatment (e.g., formation of a release film such as oxide film, compound film, or graphite film), in order to easily remove the formed nickel plating film.

The electroforming nickel bath contains a nickel ion source, an anode dissolution agent, a pH buffer, and other additives. Examples of the nickel ion source include nickel sulfamate, nickel sulfate, and nickel chloride. Examples of the anode dissolution agent include nickel chloride (in the case of Watt's bath) and ammonium chloride and nickel bromide (in the case of a bath other than Watt's bath). Generally, nickel plating is carried out at a pH of 3.0 to 6.2. For adjusting the pH to such a desired level, a pH buffer such as boric acid, formic acid, or nickel acetate is used. Examples of other additives include a brightener, a pit corrosion inhibitor, and an internal stress-reducing agent, which are used for the purposes of leveling, inhibition of pit corrosion, formation of micro-crystals, reduction of residual stress, etc.

The electroforming nickel bath is preferably a sulfamate bath. An exemplary sulfamate bath contains nickel sulfamate tetrahydrate (300 to 600 g/L), nickel chloride (0 to 30 g/L), boric acid (20 to 40 g/L), a surfactant (appropriate amount), and a brightener (appropriate amount). The pH of the bath is 2.5 to 5.0, preferably 3.5 to 4.7. The bath temperature is 20 to 65° C., preferably 40 to 60° C. In the case where the first layer 11 is produced through nickel alloy electroforming, there may be used a nickel electroforming bath containing a water-soluble phosphorus-containing acid salt such as sodium phosphite; a metal sulfamate such as ferrous sulfamate, cobalt sulfamate, or manganese sulfamate; and titanium potassium fluoride.

The first layer 11 formed of electroformed Ni—P alloy which has been produced through electroforming under the aforementioned conditions in the aforementioned nickel electroforming bath, particularly in a phosphorus-added nickel sulfamate bath, exhibits improved heat/fatigue resistance characteristics.

The second layer 12 is formed of a metal having a thermal conductivity greater than that of the electroformed nickel seamless belt. From the viewpoints of adhesion with the first layer 11 and production of the electroformed seamless belt, the second layer 12 is preferably formed of copper or a copper alloy.

The second layer 12 is preferably produced through electroplating. For example, the second layer 12 is electroplated on the surface of the first layer 11 in a plating bath. The second layer 12, obtained through electroplating, exhibits excellent adhesion to the first layer 11. In the case where the second layer 12 is formed of copper, copper plating film is formed by use of a copper plating bath. Examples of the copper plating bath include a copper sulfate plating bath, a copper pyrophosphate plating bath, a copper cyanide plating bath, and an electroless copper plating bath. Among them, a copper sulfate plating bath is preferably used. An exemplary copper plating bath contain copper sulfate (150 to 250 g/L), sulfuric acid (30 to 150 g/L), hydrochloric acid (0.125 to 0.25 mL/L), and a brightener (appropriate amount). The second layer 12 may be formed through electroless plating, physical vapor deposition, chemical vapor deposition, or a similar technique.

In the case where the second layer 12 is a plating layer of copper or a copper alloy, the third layer 13 is additionally disposed in order to impart corrosion resistance to the fixation member. The third layer 13 is preferably formed through electroplating. In one specific procedure, a plating film is formed on the second layer 12 in a plating bath, to thereby form a third layer 13. In this case, the third layer 13 is preferably formed so that the surface of the second layer 12 is virtually in non-contact with air, whereby corrosion of the second layer 12 can be more effectively prevented. When the third layer 13 is formed through electroplating, adhesion between the third layer 13 and the second layer 12 can be enhanced, and the thickness of the formed third layer 13 can be adjusted to 3 μm or less at high precision. In the case where the third layer 13 is formed of nickel or a nickel alloy, the third layer 13 can be produced through the same method as employed for producing the first layer 11. When the third layer 13 is formed from a nickel alloy such as Ni—P alloy, Ni—Fe alloy, Ni—Co alloy, Ni—Co—P alloy, or Ni—Mn alloy, the same method as employed for producing the first layer 11 may be employed, except that the electrodes or other conditions are appropriately modified. The third layer 13 may be formed through electroless plating, physical vapor deposition, chemical vapor deposition, or a similar technique.

The third layer 13 has a thickness of 0.5 µm to 2 µm, preferably about 1 µm. When the thickness is less than 0.5 µm, the oxidation inhibiting effect of the second layer 12 cannot be fully attained in some cases.

The first adhesion layer 14 is preferably formed from a silicone-based adhesive, and has a thickness of 1 to 15 µm. In this embodiment, the elastic layer 15 is formed of a silicone rubber.

The second adhesion layer 16 is formed through applying an adhesive containing PFA particles and heating the adhesive to melt the PFA particles. The second adhesion layer 16 is preferably has a thickness as small as possible, so long as the adhesion is ensured. For example, the thickness is 1 µm to 20 µm, preferably 1 µm to 10 µm.

The fluororesin layer 17 is formed of a material such as high-releasable PFA. The fluororesin layer 17 has a thickness of, for example, 1 to 150 µm, preferably 5 to 30 µm.

Figure 2A:
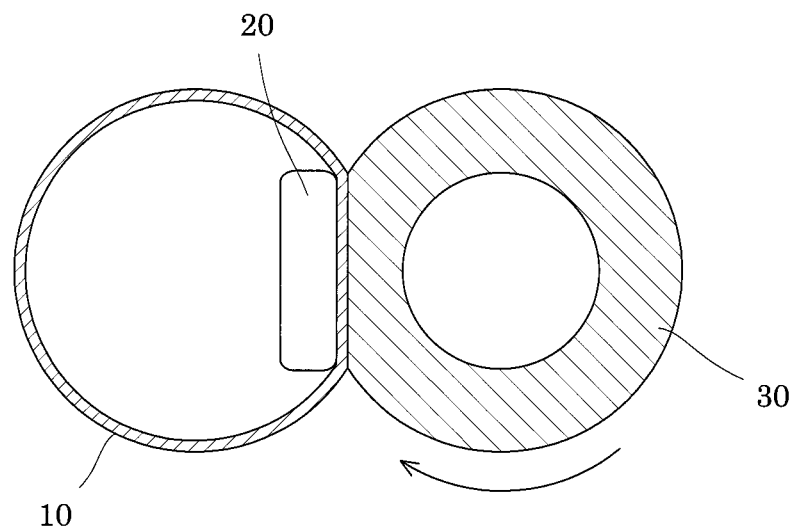
FIG. 2A is a sketch of a fixation part operated with a fixation member according to one embodiment of the present invention.

The aforementioned fixation member having a multi-layer metallic structure 10 is employed in a mode as shown in, for example, FIG. 2A. The fixation member 10 is provided with a pressing member 20 including a heater inside. In use, the fixation member 10 is pressed against a press roller 30 by means of the pressing member 20.

Figure 2B:
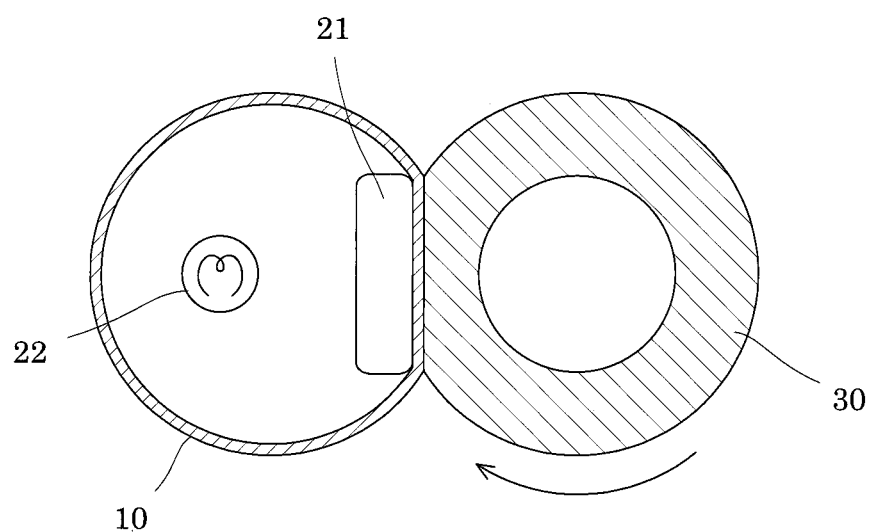
FIG. 2B is a sketch of a fixation part operated with a fixation member according to another embodiment of the present invention.

FIG. 2B shows another mode of employment of the fixation member 10. In this mode, the fixation member 10 is provided with a pressing member 21 not including a heater, and with a separately disposed heater 22. Needless to say, alternatively, an exciting coil (heat source) may be provided inside or outside the fixation member 10. In the alternative case, the fixation member 10 works as an electromagnetic induction-type heating belt.

Figure 3A:
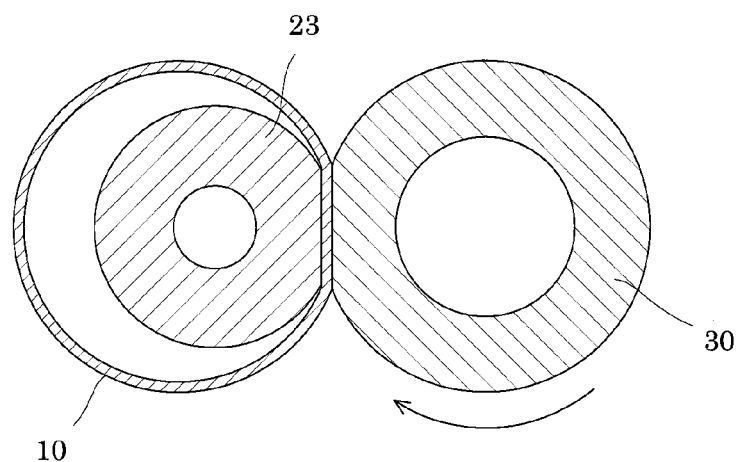
FIG. 3A is a sketch of a fixation part operated with a fixation member according to another embodiment of the present invention.
Figure 3B:
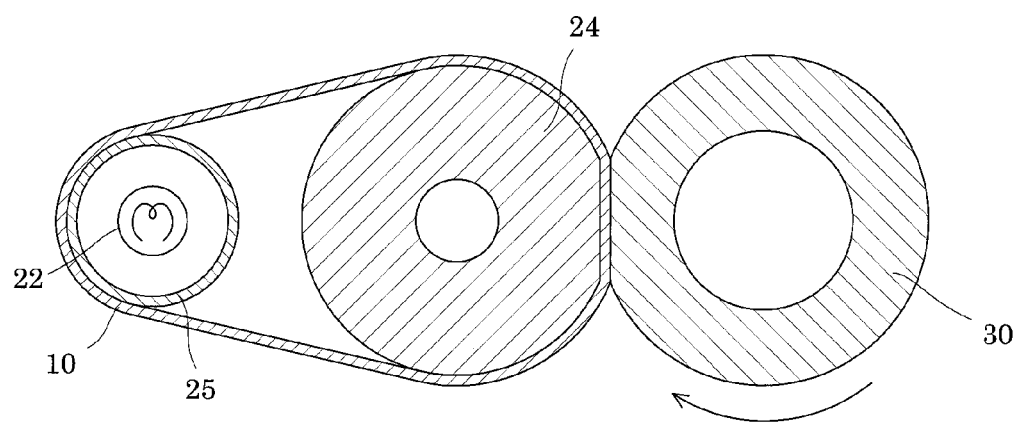
FIG. 3B is a sketch of a fixation part operated with a fixation member according to another embodiment of the present invention.

FIGS. 3A and 3B show other modes of employment of the fixation member 10. In the mode shown in FIG. 3A, a fixation roller 23 is disposed inside the fixation member 10 instead of the pressing member 20 or 21. The fixation member 10 is pressed against a press roller 30 by means of the fixation roller 23. The means for heating the fixation member 10 may be disposed inside the fixation roller 23, or outside the fixation member 10. In the mode shown in FIG. 3B, the fixation member 10 includes therein an inner roller 24 and a heating roller 25 including therein a heater, the inner roller 24 opposing a press roller 30 on top of the fixation member 10. The fixation member 10 is rotated by means of the inner roller 24 and the heating roller 25. In this case, the heater 22 of the heating roller 25 may be disposed outside the fixation member 10.

As described above, no particular limitation is imposed on the mode of employment of the fixation belt, and various modes other than those described above may be employed.

As described above, the fixation member having a multi-layer metallic structure of the present invention is suitably employed as the aforementioned fixation belt. However, the fixation member of the invention may also be employed as a transfer/fixation belt for fixation immediately after image transfer.

EXAMPLES

The present invention will next be described in detail by way of example, which should not be construed as limiting the invention thereto.
Samples 1 to 15

A phosphorus sulfamate electroforming bath of interest was prepared. The bath contained nickel sulfamate (500 g/L), sodium phosphite (150 mg/L), boric acid (30 g/L), trisodium naphthalene-1,3,6-trisulfonate serving as a primary brightener (1.0 g/L) and 2-butyne-1,4-diol serving as a second brightener (20 mg/L).

The electroforming bath was maintained at 60° C. and a pH of 4.5. A stainless steel cylinder (outer diameter: 30 mm) was employed as a negative electrode, and a depolarized nickel was employed as a positive electrode. Electroforming was performed at a current density of 16 A/dm$^2$, to thereby form a deposition layer having a thickness shown in Table 1 on the outer surface of the cylinder. The thus-formed deposition layer was removed from the cylinder, to thereby produce an electroformed nickel-phosphorus alloy first layer having an inner diameter of 30 mm and a thickness shown in Table 1. The first layer was found to have a phosphorus content of 0.5 mass %.

On the first layer, a second layer was formed by use of an electrolysis bath having the following composition. Specifically, a copper sulfate electrolysis bath of interest was prepared from copper sulfate (180 g/L), sulfuric acid (60 g/L), thiourea (0.04 g/L), and molasses (0.8 g/L). Subsequently, while the electrolysis bath was maintained at 45° C., electroplating was performed at a current density of 5 A/dm$^2$ with the aforementioned deposition layer serving as a negative electrode and a Cu—P positive electrode, to thereby form a copper second layer having a thickness shown in Table 1 on the first layer.

In the same manner, a nickel-phosphorus alloy third layer having a thickness of 1 µm was formed on the second layer. The thus-formed stacked structure was removed from the electrolysis bath, and fins of each end of the electrodeposited structure were cut away, to thereby yield a tri-layer metallic substrate.

Then, a silicone-based adhesive was applied onto the metallic substrate, to thereby form a silicone rubber layer having a thickness of 100 µm. Subsequently, a fluorine-containing adhesive was applied to the silicone rubber layer, and the rubber layer was covered with a PFA tube. The thus-obtained structure was heated at 330° C., to thereby produce a sample (each of samples 1 to 15).

Test Example 1

Temperature Distribution Profile of a Fixation Roller after Image Fixation

Figure 4:
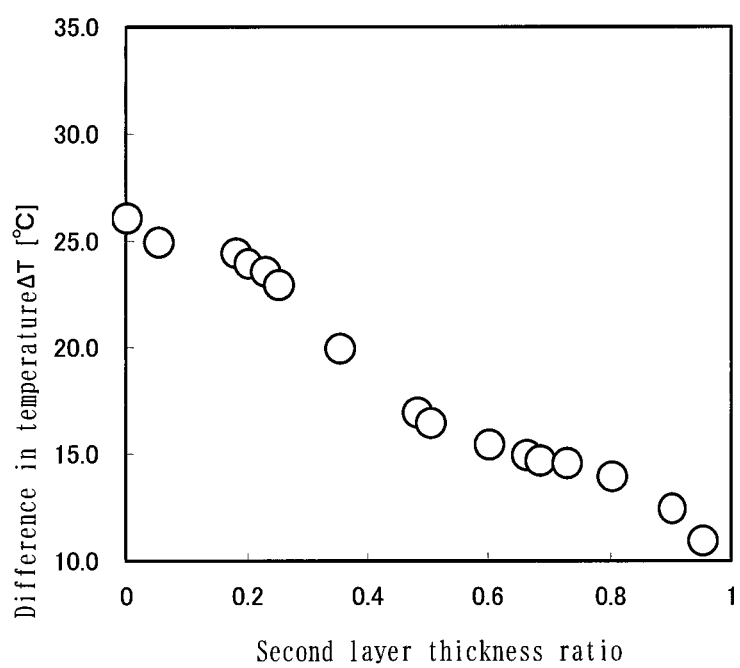
FIG. 4 is a graph showing of the results of Test Example 1.

Each of the Samples 1 to 15 was employed as a fixation belt, while a metal core (φ=24) sequentially coated with a silicone rubber layer (thickness: 3 mm) and a PFA tube (thickness: 30 µm) was employed as a press roller. By means of a fixation unit shown in FIG. 2B, 100 paper sheets (257 mm×364 mm) were continuously subjected to image fixation. After this fixation operation, the temperature of the paper sheet contact surface of the fixation belt was measured in a paper-passage area (from sheet end to a 10-mm-width inside) and in a non-paper-passage area (from sheet end to a 10-mm-width outside) by means of a non-contact-mode thermometer. The difference in temperature (ΔT) between the paper passage area and the non-paper-passage area of the fixation belt surface was calculated. Table 1 and FIG. 4 show the results.

TABLE 1

|  | 1st layer T1 (µm) | 2nd layer T2 (µm) | 3rd layer T3 (µm) | 2nd layer thickness ratio | Temp. difference ΔT |
|---|---|---|---|---|---|
| Sample 1 | 37 | 2 | 1 | 0.05 | 25.0 |
| Sample 2 | 32 | 7 | 1 | 0.18 | 24.5 |

TABLE 1-continued

|  | 1st layer T1 (μm) | 2nd layer T2 (μm) | 3rd layer T3 (μm) | 2nd layer thickness ratio | Temp. difference ΔT |
|---|---|---|---|---|---|
| Sample 3 | 31 | 8 | 1 | 0.20 | 24.0 |
| Sample 4 | 30 | 9 | 1 | 0.23 | 23.7 |
| Sample 5 | 29 | 10 | 1 | 0.25 | 23.0 |
| Sample 6 | 25 | 14 | 1 | 0.35 | 20.0 |
| Sample 7 | 20 | 19 | 1 | 0.48 | 17.0 |
| Sample 8 | 19 | 20 | 1 | 0.50 | 16.5 |
| Sample 9 | 15 | 24 | 1 | 0.60 | 15.5 |
| Sample 10 | 12.5 | 26.5 | 1 | 0.66 | 15.0 |
| Sample 11 | 12 | 27 | 1 | 0.68 | 14.8 |
| Sample 12 | 10 | 29 | 1 | 0.73 | 14.6 |
| Sample 13 | 7 | 32 | 1 | 0.80 | 14.0 |
| Sample 14 | 3 | 36 | 1 | 0.90 | 12.5 |
| Sample 15 | 1 | 38 | 1 | 0.95 | 11.0 |
| Comp. Sample | 40 | — | — | 0 | 26.2 |

Results

As is clear from Table 1 and FIG. 4, samples having a ratio of the thickness of the second layer to the total thickness of 0.66 or more (0.95 or less) attained a difference in temperature (ΔT) of 15° C. or less.

What is claimed is:

1. A fixation member having a multi-layer metallic structure, the fixation member comprising:
a metallic substrate including a first layer formed of an electroformed seamless belt made of nickel or a nickel alloy, and a second layer formed of an electroformed seamless belt made of a metal having a thermal conductivity greater than that of the first layer;
an adhesion layer disposed on the surface of the second layer; and
a fluororesin layer disposed on top of the adhesion layer,
wherein the ratio of the thickness of the second layer to the total thickness of the metallic substrate is 0.66 to 0.95.

2. The fixation member according to claim 1, wherein the second layer is formed of a plating layer made of copper or a copper alloy, and the fixation member further has, on the second layer, a third layer made of a metal having a corrosion resistance higher than that of the second layer.

3. The fixation member according to claim 2, wherein the third layer is formed of a plating layer made of nickel or a nickel alloy.

4. The fixation member according to claim 1, further comprising an elastic layer intervening between the metallic substrate and the fluororesin layer.

5. The fixation member according to claim 2, further comprising an elastic layer intervening between the metallic substrate and the fluororesin layer.

6. The fixation member according to claim 3, further comprising an elastic layer intervening between the metallic substrate and the fluororesin layer.

7. The fixation member according to claim 1, wherein the difference in temperature between a paper passage area of the fixation member and a non-paper-passage area is 15° C. or less, after the fixation member is subjected to a 100 paper sheets passage test.

8. The fixation member according to claim 1, wherein the total thickness of the metallic substrate is 20 to 100 μm.

* * * * *